United States Patent

Ushiro

[11] Patent Number: 5,721,460
[45] Date of Patent: Feb. 24, 1998

[54] CAPSTAN MOTOR

[75] Inventor: Tatsuzo Ushiro, Kawaguchi, Japan

[73] Assignee: Canon Kabushiki Kaisha, Tokyo, Japan

[21] Appl. No.: 630,248

[22] Filed: Apr. 10, 1996

[30] Foreign Application Priority Data

Apr. 14, 1995 [JP] Japan .................................. 7-089398

[51] Int. Cl.$^6$ ..................................................... H02K 7/10
[52] U.S. Cl. .................. 310/75 R; 310/68 B; 310/68 R; 310/166; 310/258; 310/268; 360/99.04; 360/99.12
[58] Field of Search ................. 310/75 R, 68 B, 310/68 R, 166, 156, 258, 268; 360/99.04, 99.12

[56] References Cited

U.S. PATENT DOCUMENTS

| | | | |
|---|---|---|---|
| 4,801,830 | 1/1989 | Ogino et al. | 310/68 B |
| 4,902,924 | 2/1990 | Ushiro et al. | 310/268 |
| 5,101,131 | 3/1992 | Ushiro et al. | 310/258 |

FOREIGN PATENT DOCUMENTS 1-109275  7/1989  Japan .

*Primary Examiner*—Thomas M. Dougherty
*Assistant Examiner*—Timothy A. Williams
*Attorney, Agent, or Firm*—Fitzpatrick, Cella, Harper & Scinto

[57] ABSTRACT

In a capstan motor, a gear portion and an FG detection portion are integrally formed of a plastic magnet at mutually different wall thicknesses and they are fixed to the outer circumference of a rotor yoke. The FG detection portion is provided with multipolar magnetization to generate a rotation detection signal with a magnetoresistance element. The gear portion is arranged to transmit the drive force to the outside. The outer diameter of the rotor yoke is different at the gear portion and at the FG detection portion, depending upon the wall thicknesses of the plastic magnet. The outer diameter is set to be greater in the portion corresponding to the FG magnet of the rotor yoke.

5 Claims, 4 Drawing Sheets

CAPSTAN MOTOR

BACKGROUND OF THE INVENTION

1. Field of the Invention

The present invention relates to a capstan motor improved in drive accuracy of tape drive of magnetic recording/reproducing apparatus.

2. Related Background Art

The conventional magnetic recording/reproducing apparatus (hereinafter referred to as VCR) has such a structure that there are provided a capstan motor for performing a tape carry drive operation of a tape as a magnetic recording medium and a reel motor for winding up the tape carried thereto. A tape guide for making the tape wind around a cylinder is separately provided at a predetermined position. The apparatus is also provided with a loading motor for withdrawing the tape out of a cassette. Also, the cylinder has a cylinder motor for driving a magnetic head.

However, with recently developed integral-type VCR integrated with a video camera, the mainstream method of transmission of drive force is the one for transmitting the drive force from the capstan motor to perform tape winding in place of that by the reel motor in order to achieve a size reduction, a decrease in dissipation power, and a reduction of cost.

Particularly, in order to decrease the size and the thickness of the apparatus of a VCR, a recently proposed method is, for example as described in Japanese Laid-open Utility Model Application No. 1-109275, such that a gear is formed on the outer circumference of a rotor unit integrally with a magnet for detecting the velocity of the motor (hereinafter referred to as an FG detecting magnet) and the drive force is taken out from the side. This method is suitable for a compact and thin arrangement of the apparatus because the drive force is taken out through the transmission gear from the side of the motor part of the capstan motor.

However, the capstan motor with the gear integrally formed with the FG detecting magnet on the outer circumference of the rotor unit employs a plastic magnet as the FG detecting magnet. This plastic magnet contains a main component of powder of ferrite for the magnetic material and a binder of a plastic material, such as a nylon based material, a PPS based material, or the like. Therefore, the wall thickness is thin for teeth of the gear integrally formed with the FG detecting magnet on the outer circumference of the rotor yoke, and the teeth are fragile and brittle. The conventional arrangement thus had a quality problem.

If the wall thickness of the FG detecting magnet is increased in order to raise the strength of the gear, the entire motor will increase the size. In that case, the rotary portion of the motor is small though the configuration of the motor is large. Such motors have the problem that torque characteristics and inertial mass of the motor were so small as to cause rotational unevenness.

SUMMARY OF THE INVENTION

An object of the present invention is to solve the above problems, thereby providing a capstan motor of such a structure as to increase the inertial mass by securing the wall thickness of the gear portion on the outer circumference of the rotor yoke and without lowering the torque characteristics of the motor.

The other objects of the present invention will become apparent in the description of specific embodiments to follow.

DESCRIPTION OF THE PREFERRED EMBODIMENTS

The embodiments of the present invention will be explained with reference to the accompanying drawings.

(Embodiment 1)

Figure 1:
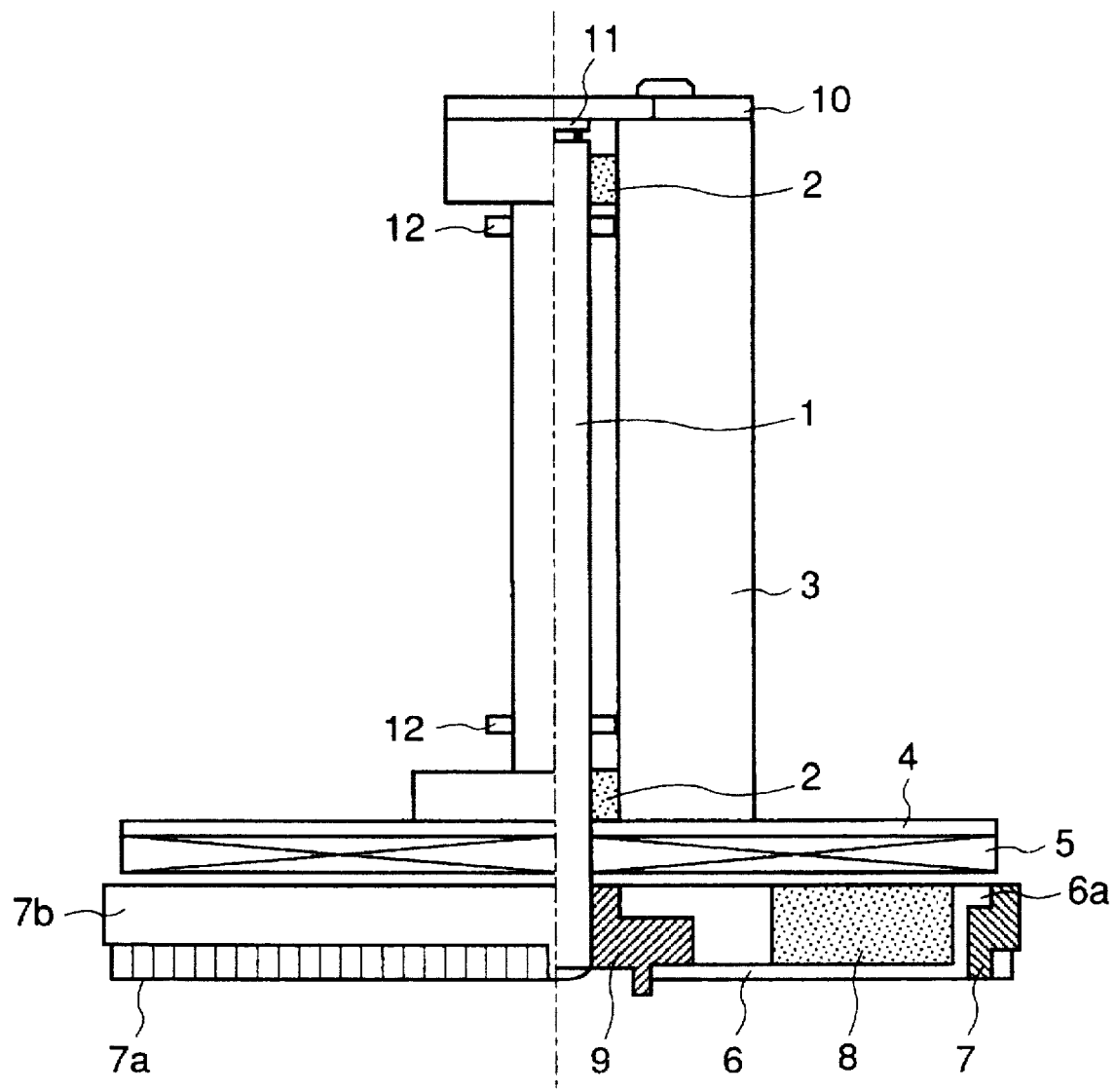
FIG. 1 is a structural drawing, partly in cross section, to show a first embodiment of the present invention.

FIG. 1 is a drawing to show the structure of the whole of the capstan motor associated with the first embodiment of the present invention, in which the right half is shown as a cross section. In FIG. 1, reference numeral 1 denotes a capstan shaft for tape driving, against which a pinch roller, not shown, is urged. Numeral 2 designates bearings for rotatably supporting the capstan shaft 1 at the top and at the bottom, and 3 denotes a bearing housing to which the bearings 2, for rotatably supporting the capstan shaft 1 up and down, are fixed. A stator yoke 4 of the motor portion is fixed to this bearing housing 3 so as to be perpendicular to the capstan shaft 1. Numeral 5 represents a plurality of driving coils disposed on the stator yoke 4, facing a disk drive magnet 8, as described below. Numeral 6 is a rotor yoke fixed through a bush 9 to the capstan shaft, facing the stator yoke 4. Placed on this rotor yoke 6 is the disk drive magnet 8 with multipolar magnetization, opposed to the plurality of driving coils 4 on the stator yoke 4. Numeral 7 stands for an FG magnet fixed to the outer circumference of the rotor yoke 6, in which a magnet portion, 7b, for detecting the velocity of the motor (hereinafter referred to as an FG magnet portion) and a drive transmission gear portion 7a, are integrally formed of a plastic magnet in respective, different wall thicknesses. The outer diameter of each portion in the circumferential portion of the rotor yoke 6 is changed depending upon the wall thickness of the plastic magnet of the FG magnet 7. Namely, the plastic magnet of the FG magnet 7 is formed so that the wall thickness of the drive transmission gear portion 7a is large while the wall thickness of the FG magnet portion 7b is small. In response thereto, a portion corresponding to the FG magnet portion 7b in the outer circumference portion of the rotor yoke 6 is formed as a flange 6a with a large outer diameter while a portion thereof corresponding to the drive transmission gear portion 7a is formed in a smaller outer diameter. Multipolar magnetization narrow in the radial direction is given in the FG magnet portion 7b, and the velocity is detected by a magnetoresistance element not shown. The magnetization pitch per pole of the FG magnet portion 7b is between 80 and 200 μm. The drive transmission gear portion 7a is for transmitting the drive force to the outside.

Numeral 10 designates a thrust receiver for regulating the axial force of the capstan shaft 1 caused by attractive force between the drive magnet 8 and the stator yoke 4. This thrust receiver 10 receives the axial force of the capstan shaft 1 through a thrust bearing 11. The thrust receiver 10 is screwed to the bearing housing 3. Numeral 12 stands for oil stoppers for stopping oil from leaking out of the bearings 2.

As explained, the outer diameter of each portion in the outer circumference portion of the rotor yoke 6 is changed depending upon the wall thickness of the plastic magnet of the FG magnet 7, the FG magnet portion 7b is formed with the small wall thickness, and the portion corresponding to the FG magnet portion 7b in the outer circumference portion of the rotor yoke 6 is formed as the flange 6a in the larger outer diameter throughout the circumference. This increases the inertial mass of the motor and improves the rotation accuracy of the motor when this capstan motor is rotation-driven. Further, magnetic flux leakage out of the drive magnet 8 can be absorbed by the flange 6a in the outer peripheral portion of the rotor yoke 6, which greatly reduces noise from the drive magnet 8 in FG detection with the magnetoresistance element. Therefore, the control characteristics can be considerably improved.

(Embodiment 2)

Figure 2:
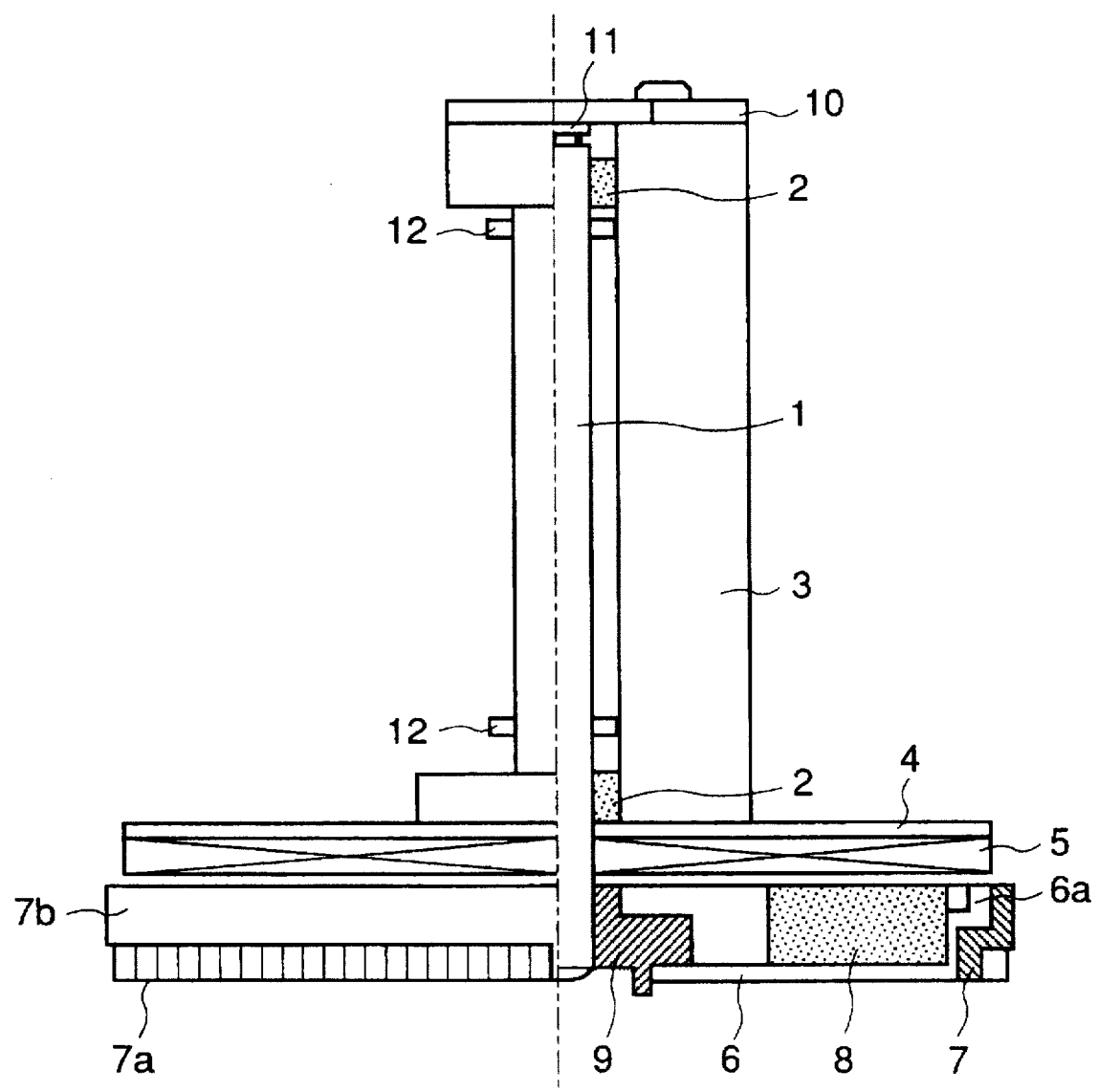
FIG. 2 is a structural drawing, partly in cross section, to show a second embodiment of the present invention.

FIG. 2 is a drawing, partly in cross section, to show the structure of the capstan motor associated with the second embodiment of the present invention. In this second embodiment, a large diameter portion 6b is formed in a larger outer diameter in most of the portion corresponding to the FG magnet portion 7b in the outer circumference portion of the rotor yoke 6. This embodiment has an advantage such that the inertial mass of motor can be greater than that in the first embodiment as described above and the rotation accuracy of motor can be improved.

(Embodiment 3)

Figure 3:
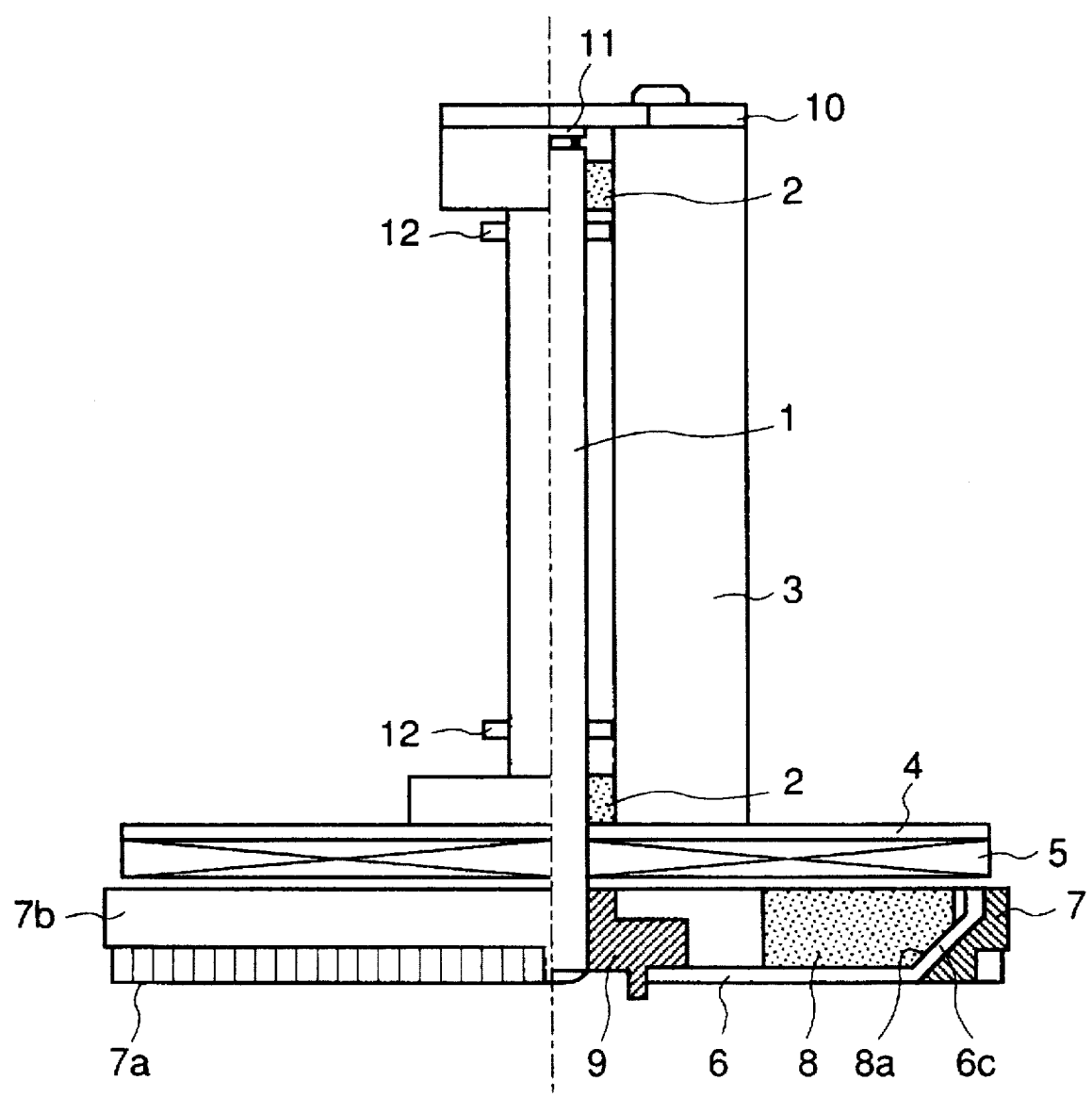
FIG. 3 is a structural drawing, partly in cross section, to show a third embodiment of the present invention.

FIG. 3 is a drawing, partly in cross section, to show the structure of the capstan motor associated with the third embodiment of the present invention. The third embodiment is arranged so that the wall thickness of the plastic magnet is gradually increased from the FG magnet portion 7b to the drive transmission gear portion 7a and the outer diameter of the outer circumference portion of the rotor yoke 6 is gradually increased from the drive transmission gear portion 7a to the portion corresponding to the FG magnet portion 7b to form a slant portion 6c, which can improve the torque characteristics of motor.

(Embodiment 4)

Figure 4:
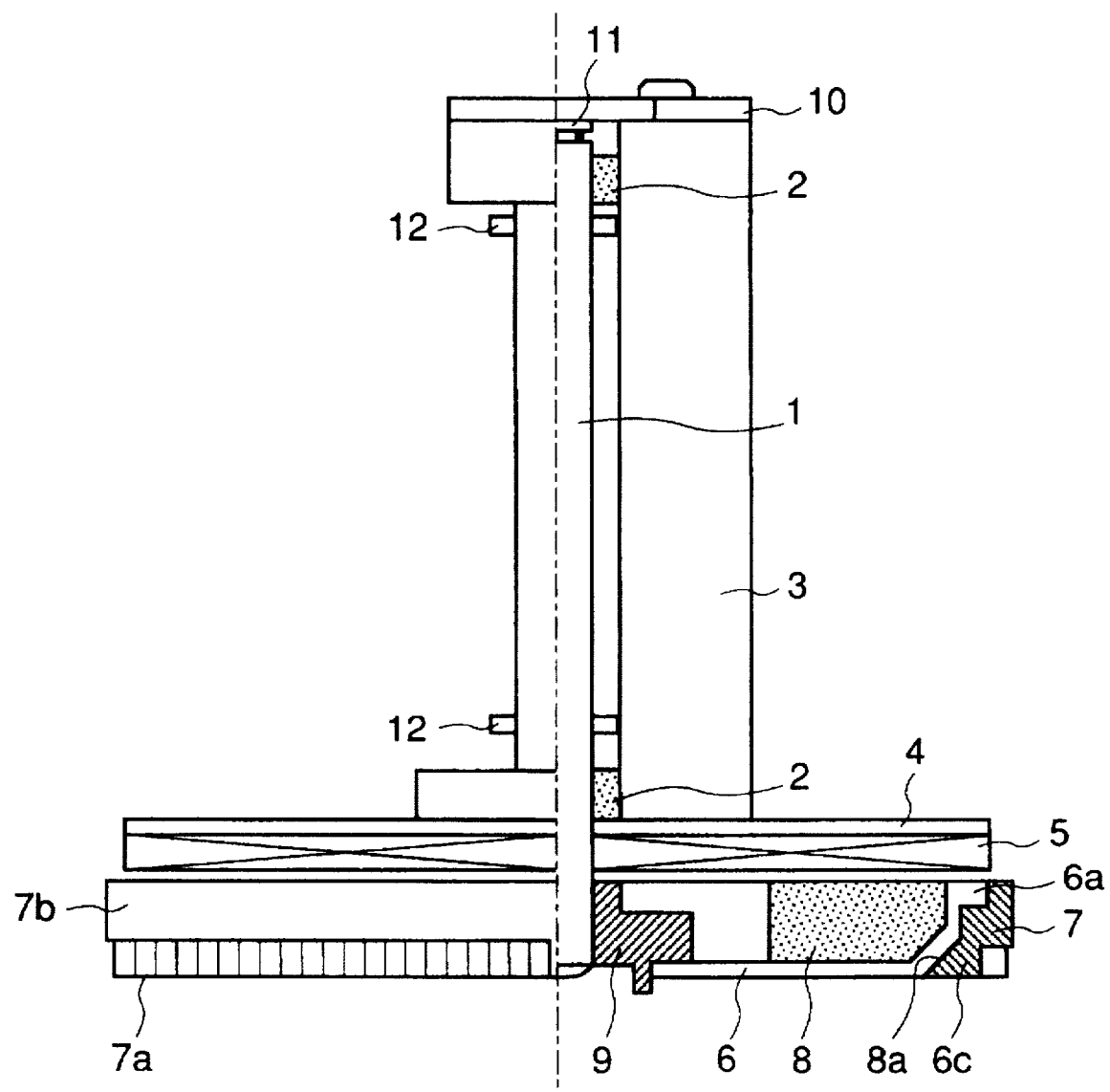
FIG. 4 is a structural drawing, partly in cross section, to show a fourth embodiment of the present invention.

FIG. 4 is a drawing, partly in cross section, to show the structure of the capstan motor associated with the fourth embodiment of the present invention. The fourth embodiment is arranged in such a manner that the wall thickness of the plastic magnet is gradually increased from the FG magnet portion 7b to the drive transmission gear potion 7a, similar to the third embodiment, such that the outer diameter of the outer circumference portion of the rotor yoke 6 is gradually increased from the drive transmission gear portion 7a to the portion corresponding to the FG magnet portion 7b to form a slant portion 6c, and such that the edge of the outer circumference of the rotor yoke 6 in the fourth embodiment is formed as a flange 6a with a large diameter in the same manner as in the first embodiment, which can increase the inertial mass of motor and which can improve the rotation accuracy of motor. Further, the magnetic flux leakage from the drive magnet 8 can be absorbed by the flange 6a of the outer circumference of the rotor yoke 6, the noise from the drive magnet 8 can be greatly reduced in detection with the magnetoresistance element, and the control characteristics can be greatly improved.

As detailed above, the present invention can provide a capstan motor in which the FG magnet portion 7b and drive transmission gear portion 7a are integrally formed in the axial direction on the outer circumference of the rotor yoke and in which the drive transmission gear portion 7a is located on the lower side, thereby increasing the outer shape of the rotor yoke on the FG detection side, increasing the wall thickness of the FG magnet in the gear portion, improving the reliability, increasing the inertial mass, and improving the rotation accuracy of motor. Further, when the outer circumference portion is chamfered on the rotor yoke side of the drive magnet 8, the wall thickness of the FG magnet of the gear portion can be increased, the reliability can be improved, the inertial mass can be increased, the rotation accuracy of motor can be improved, the outer diameter of the drive magnet on the drive coil side can be increased, and the torque characteristics can be improved. Since the outer circumference of the rotor yoke is provided with a flange, the magnetic flux leakage from the drive magnet can be absorbed thereby, and the accuracy of FG detection output can be greatly improved.

What is claimed is:

1. A capstan motor comprising:

a capstan shaft;

a rotor yoke mounted to said capstan shaft;

a drive magnet fixed to said rotor yoke, said drive magnet being formed in a disk shape and being provided with multipolar magnetization;

a stator yoke opposed to said rotor yoke;

a plurality of coils disposed on said stator yoke, said plurality of coils exciting said stator yoke to drive said rotor yoke;

a bearing housing for supporting said capstan shaft, said stator yoke being mounted to said bearing housing; and a plastic magnet fixed to an outer circumference portion of said rotor yoke, said plastic magnet having a velocity detecting magnet portion and a drive transmission gear portion, wherein said velocity detecting magnet portion and drive transmission gear portion are integrally formed of mutually different wall thicknesses and wherein an outer diameter of each portion in the outer circumference portion of said rotor yoke is changed depending upon the wall thicknesses of said plastic magnet, wherein said rotor yoke has a larger diameter at a portion corresponding to said velocity detecting magnet portion at the outer circumference portion thereof than at a portion corresponding to said drive transmission gear portion at the outer circumference portion thereof.

2. A capstan motor according to claim 1, wherein the wall thicknesses of the plastic magnet fixed to the outer circumference portion of said rotor yoke are set so that the wall thickness of the drive transmission gear portion is larger than the wall thickness of the velocity detecting magnet portion.

3. A capstan motor according to claim 1, wherein the wall thicknesses of the plastic magnet fixed to the outer circumference portion of said rotor yoke are set so as to gradually increase from the velocity detecting magnet portion to the drive transmission gear portion and the outer diameter of the outer circumference portion of said rotor yoke is gradually decreased in an opposite manner from the increase of the wall thicknesses of the plastic magnet.

4. A capstan motor according to claim 3, wherein a portion where the outer diameter of the outer circumference portion of said rotor yoke is gradually decreased is formed in a slant shape and, in correspondence thereto, an outer circumference of a junction surface of said drive magnet to said rotor yoke is formed obliquely.

5. A motor comprising:

a rotor yoke having a rotational shaft;

a drive magnet fixed to said rotor yoke, said drive magnet being formed in a disk shape and being provided with multipolar magnetization;

a stator yoke opposed to said rotor yoke;

a plurality of coils disposed on said stator yoke, said plurality of coils exciting said stator yoke to drive said rotor yoke; and a plastic magnet fixed to an outer circumference of said rotor yoke, said plastic magnet having a velocity detecting magnet portion and a drive transmission gear portion, wherein said velocity detecting magnet portion and drive transmission gear portion are integrally formed of mutually different wall thicknesses, wherein said rotor yoke has a larger diameter at a portion corresponding to said velocity detecting magnet portion at the outer circumference thereof than at a portion corresponding to said drive transmission gear portion of the outer circumference thereof.

* * * * *